3,272,959
ELECTRIC ARC TORCHES
James A. Browning, Hanover, N.H., assignor to Thermal Dynamics Corporation, Lebanon, N.H., a corporation of New Hampshire
Filed Feb. 24, 1965, Ser. No. 434,779
6 Claims. (Cl. 219—75)

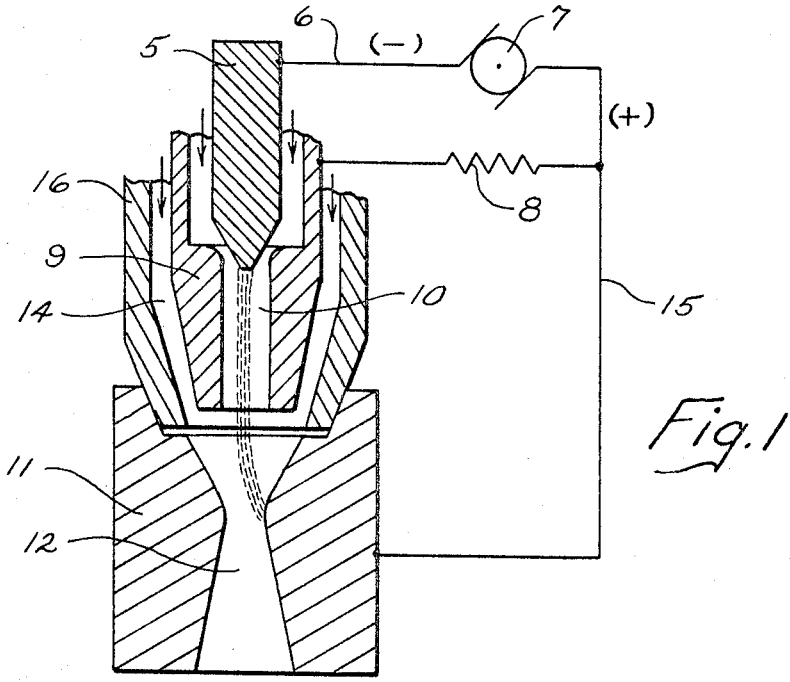
Fig.1
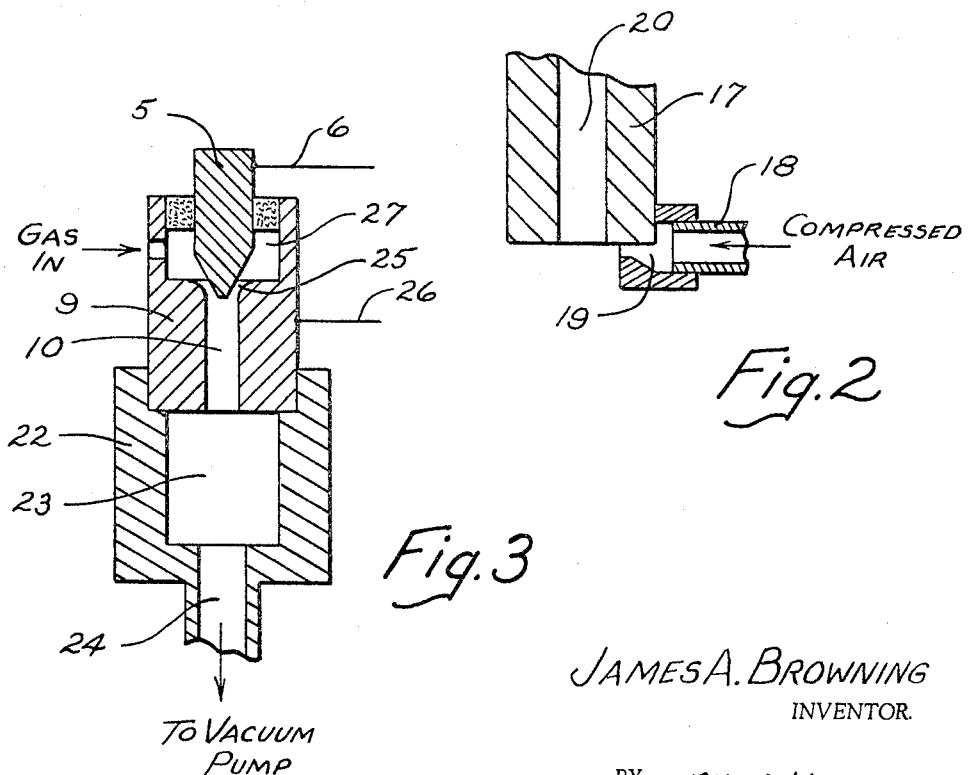
Fig.2
Fig.3
James A. Browning
INVENTOR.
BY Wm. O. Moeser

My invention relates to electric arc torches and relates more particularly to a novel method and device for starting such torches by initiating the necessary electric arc discharge.

Arc torches to which my invention is applicable are of the type as shown generally in my U.S. Patent 3,027,446 issued March 27, 1962. Such devices generate high temperature flames which are produced by stabilizing an electric arc with the flow of one or more plasma forming gases. Such gases, in turn, are heated to the plasma state, and the efflux provides an effective heat source for a wide variety of applications in industry and research.

Plasma forming electric arc torches are usually operated from D.C. power sources. The initiation of the arc has been accomplished with a high frequency section of the power supply, as it is convenient to break down the arcing gap in the torch with a high frequency voltage source applied across the torch electrodes. The use of such auxiliary power devices, while effective, places an additional requirement on the power supply, thereby increasing its cost and complication. Then too, high frequency energy sources radiate electromagnetic energy to a considerable extent and this phenomenon is detrimental to radio reception. Until recent years plasma flame generators have been laboratory curiosities, but their expanded acceptance and widespread use as industrial tools has made the use of high frequency increasingly objectionable.

In accordance with my invention, I am able to eliminate completely any auxiliary high frequency power source, and I need only a power supply adapted to sustain the working arc in the torch. Means to accomplish this are readily at hand in supporting apparatus already present and required to operate a plasma arc torch installation.

The voltage required to break down a gap across which such voltage is applied varies directly (though not necessarily linearly) with the pressure of the gas occupying that gap. According to Paschen's law the sparking potential is a function of the product of pressure and gap length. For air at one atmosphere, a gap in the order of 0.1 centimeter is bridged by a voltage of approximately 4,350 v. At one-half atmosphere, the required voltage drops to 2500 v.; and at one-tenth atmosphere, the voltage drops further to under 1000 v.

I am able to use the gas means already available at the torch to initiate arcs using only the open circuit voltage of the regular torch power supply. For a further understanding of my invention reference is now made to the following description and accompanying drawing, in which:

FIGURE 1 is a view, in section, of an electric arc torch utilizing the invention;

FIGURE 2 is a sectional view (in detail) of another mode of carrying out the invention; and FIGURE 3 is a schematic representation of an alternate method of applying the principles of the invention.

Referring now more particularly to FIGURE 1, the essential elements of a high pressure, plasma forming electric arc torch are shown, in simplest form for clarity. An electrode 5 is connected by lead 6 to a suitable source 7 of electrical energy. The opposite terminal of source 7 is connected through a limiting resistor 8 to a nozzle element 9, in which is formed an arc passageway 10. The narrowest point in the gap between electrode 5 and nozzle element 9 is wider than that which can be broken down by the applied voltage from source 7 at one atmosphere.

Plasma forming gases are applied under pressure around electrode 5 and enter arc passageway 10 when the torch is in full operation. A nozzle 11 may be added to shape the plasma output of the torch through passageway 12. A portion of the plasma forming gases may be first applied through annular passage 14 defined by outer shell 16, which surrounds the nozzle element 9.

The sequence of the starting operation of this torch may be as follows: open circuit power supply voltage is applied between electrode 5 and nozzle element 9. As has been seen, the gap between these circuit components is normally sufficiently large to prevent the initiation of an arc. A flow of gases is next provided through the annular passage 14. The aspirating action of this flow substantially reduces the pressure in the arc passageway 10 and in the immediate region of the gap between electrode 5 and nozzle element 9 to a value below one atmosphere. This action reduces the critical break-down voltage point to that below the applied power supply voltage. An arc is thus immediately established across the narrow gap as heretofore explained.

This arc may be termed a pilot arc with a total current flow limited by the resistor 8. Immediately upon establishing this arc the main flow of plasma forming gases is established around electrode 5 and into arc passageway 10. This main flow drives the arc well into the arc passageway 10 and the arc remains self-sustaining by reason of the ionization of the stabilizing gas flow. In the non-transferred mode the arc may be made to impinge on the inner wall of passageway 12 with lead 15 providing the return circuit, as shown by the dotted lines representing the arc column.

If it is desired to operate the torch in the transferred mode, a conductive workpiece would supply the terminal point for the arc. In such case lead 15 would be electrically attached to the workpiece. The arc column would then extend directly from electrode 5 to a workpiece to be cut, welded or treated in any other way. The arc initiation in either case would be the same.

FIGURE 2 shows an alternative method of reducing the pressure in the arc region. I provide a duct 18 and jet shaping manifold 19 through which a stream of compressed air or other gases is supplied and directed across the passageway 20 of a torch nozzle 17, normal to the axis thereof as shown. This primary flow acts to reduce the pressure in the minimum arc gap (not shown in FIGURE 2) to thereby permit the initiation of the arc, solely by application of the normal D.C. power supply voltage. After arc initiation it is desirable to shut off the flow of this gas so as not to interfere with the torch efflux. The main arc thus established will of course be sustained as before by the main flow of plasma forming fluid.

These methods of initiating the arc shown in FIGURES 1 and 2 normally do not require the addition of extra apparatus, as sources of gas under pressure are already available for the operation of the torch itself. In certain cases a reduction in pressure in the gap region may be achieved by placing the nozzle of a torch momentarily over an adapter to which is attached a vacuum pump. I have found that such a device can often be supplied for a torch installation at far less cost than including a high frequency arc starting circuit in the power supply itself.

This latter arrangement is shown in FIGURE 3 representing an arc torch substantially identical to that shown in FIGURE 1. As shown, the arc nozzle may be inserted in an adapter 22 having a chamber 23 from which the air is evacuated by a vacuum pump through a duct 24. As before this will reduce the pressure in the gap 25 to the point where the normal applied working voltage is able to break down such gap and initiate the desired arc. In this case, in the non-transferred mode, lead 26 supplies the circuit return. After the arc has been established the torch is simply removed from the adapter, plasma forming gas is introduced into chamber 27, and the unit ready for operation.

While I have described several modifications of my invention, variations utilizing the basic principles thereof within the spirit and scope of the following claims may occur to persons skilled in the art.

I claim:

1. In an electric arc torch having an arc gap, the method of initiating an arc in said torch comprising applying a voltage across said gap, said voltage being below the breakdown value required to bridge said gap at substantially one atmosphere; and reducing the fluid pressure in the region of said gap until an arc is struck across said gap.

2. The method of starting and operating an electric arc torch having two electrodes with an arc gap therebetween, one electrode forming a torch nozzle with an arc passageway therein, comprising the steps of applying a voltage across said gap, said voltage being below the breakdown value required to bridge said gap under standard conditions; reducing the fluid pressure in the region of said gap until a pilot arc is struck across said gap; and then supplying plasma forming, arc stabilizing fluid under pressure through said gap and into said passageway to stabilize and maintain an arc column therein.

3. The method according to claim 2 in which said last step drives the arc column through said passageway to an electrical return external to said torch.

4. An electric arc torch having a first electrode; a second electrode spaced from said first electrode to form an arc gap, said second electrode being in the form of a nozzle having an arc passageway therein; power means capable of sustaining an arc discharge across said gap; means for reducing the gas pressure in the region of said gap at selected times; and gas means to stabilize an arc discharge and support an arc column at least part way into said arc passageway.

5. An electric arc torch according to claim 4 in which said means for reducing the gas pressure comprise a jet outlet to direct gas under pressure at the opening of said nozzle and normal to the axis thereof.

6. An electric arc torch comprising a first electrode; a nozzle electrode spaced from said first electrode and having an arc passageway therein; electrical power means capable of maintaining an arc between said electrodes; a gas passage at said first electrode for delivering arc stabilizing, plasma forming fluid under pressure into said arc passageway; a second gas passage for delivering an aspirating flow of fluid under pressure external to said arc passageway to reduce the normal pressure therein and in the space between said electrodes.

References Cited by the Examiner

UNITED STATES PATENTS

| | | | |
|---|---|---|---|
| 2,587,331 | 2/1952 | Jordan | 219—75 |
| 2,806,124 | 9/1957 | Gage | 219—121 |
| 2,996,633 | 8/1961 | Foster | 313—7 |
| 3,075,065 | 1/1963 | Ducati et al. | 219—75 |

RICHARD W. WOOD, *Primary Examiner.*